US010882611B2

(12) United States Patent
Foskey

(10) Patent No.: US 10,882,611 B2
(45) Date of Patent: Jan. 5, 2021

(54) AUGMENTED SWASHPLATE ASSEMBLY

(71) Applicant: Bell Helicopter Textron Inc., Fort Worth, TX (US)

(72) Inventor: Christopher Edward Foskey, Keller, TX (US)

(73) Assignee: Textron Innovations Inc., Providence, RI (US)

(*) Notice: Subject to any disclaimer, the term of this patent is extended or adjusted under 35 U.S.C. 154(b) by 305 days.

(21) Appl. No.: 16/035,381

(22) Filed: Jul. 13, 2018

(65) Prior Publication Data
US 2020/0017205 A1   Jan. 16, 2020

(51) Int. Cl.
*B64C 27/605* (2006.01)
*B64C 27/50* (2006.01)
*B64C 29/00* (2006.01)

(52) U.S. Cl.
CPC ............ *B64C 27/605* (2013.01); *B64C 27/50* (2013.01); *B64C 29/0033* (2013.01)

(58) Field of Classification Search
CPC ....... B64C 27/50; B64C 27/605; B64C 11/28; B64C 29/0033
See application file for complete search history.

(56) References Cited

U.S. PATENT DOCUMENTS

| | | | |
|---|---|---|---|
| 6,170,779 B1* | 1/2001 | Nyhus | B64C 27/24 244/17.11 |
| 9,022,314 B1* | 5/2015 | van der Westhuizen | B64C 27/18 244/17.25 |
| 2015/0274290 A1* | 10/2015 | Fenny | B64C 27/41 244/17.25 |
| 2016/0101851 A1* | 4/2016 | Hoyle | B64C 27/32 416/1 |
| 2016/0251076 A1* | 9/2016 | Tian | B64C 27/10 701/2 |
| 2016/0318600 A1* | 11/2016 | Wirasnik | B64C 11/28 |
| 2019/0061915 A1* | 2/2019 | Miller | B64C 27/605 |

* cited by examiner

*Primary Examiner* — Christopher D Hutchens
(74) *Attorney, Agent, or Firm* — Lightfoot & Alford PLLC

(57) ABSTRACT

Systems and methods of operating a tiltrotor aircraft include providing the tiltrotor with a plurality of rotatable pylon assemblies. Each pylon assembly includes a rotor system having a plurality of rotor blades operatively coupled to a rotor mast and selectively rotatable in response to rotation of the rotor mast, a swashplate assembly operatively coupled to the plurality of rotor blades, a plurality of swashplate actuators operatively coupled to the swashplate assembly and selectively extendable and retractable to control the position and the orientation of the swashplate assembly, and a swashplate augmenting system. The swashplate augmenting system is selectively operable to cause axial translation of the swashplate actuators and swashplate assembly to augment the travel of the swashplate actuators in order to fold the plurality of rotor blades for operating the tiltrotor aircraft in an airplane forward flight mode.

20 Claims, 9 Drawing Sheets

AUGMENTED SWASHPLATE ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Tiltrotor aircraft are generally operable in a helicopter flight mode to ascend from and/or descend to a landing area and in an airplane flight mode to propel the aircraft forward. The transition from the helicopter flight mode to the airplane flight mode, and vice versa, is generally accomplished by selectively pivoting engine or pylon assemblies of the aircraft between a vertical orientation and a horizontal orientation to change the thrust angle of the rotatable aircraft blades. However, tiltrotor aircraft are prone to various aeroelastic instabilities that other aircraft may not experience. This is generally because of the variable thrust angles and forward flight speeds achieved by such tiltrotor aircraft.

DETAILED DESCRIPTION

Figure 1:
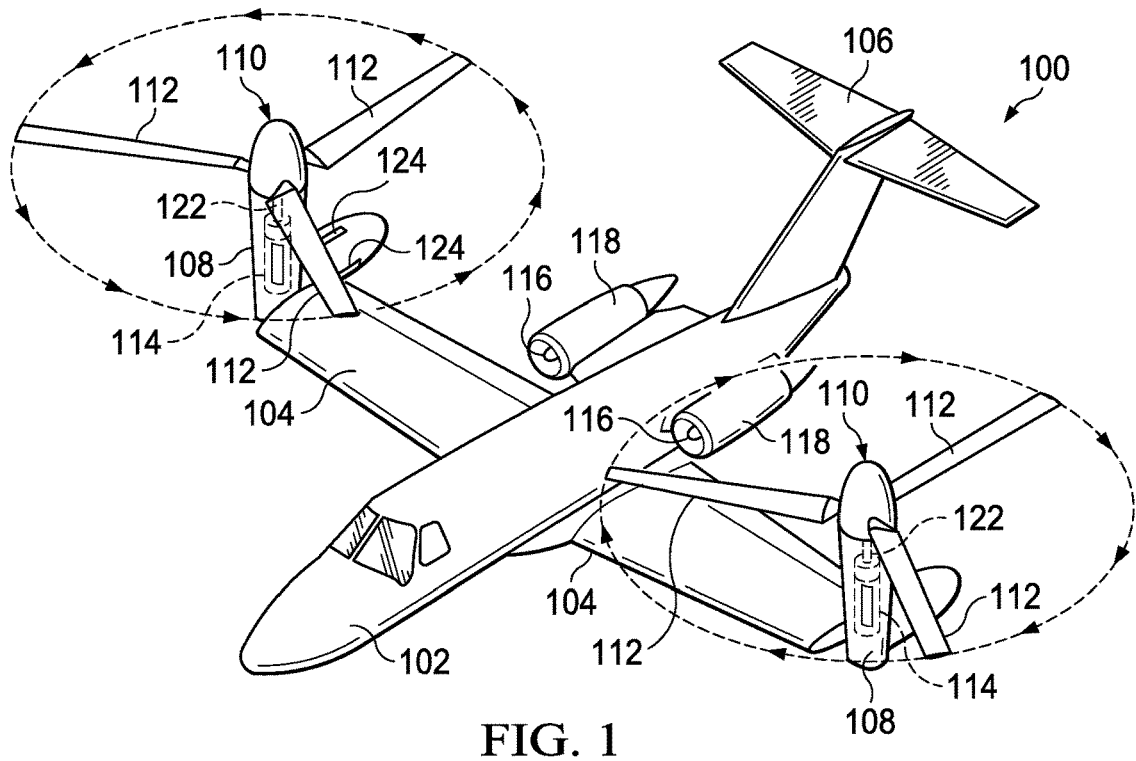
FIG. 1 is an oblique view of a tiltrotor aircraft according to this disclosure and configured for operation in a helicopter flight mode.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1 through 4, oblique views of a tiltrotor aircraft 100 configured for operation in a helicopter flight mode, configured for operation in a proprotor forward flight mode, configured in transition from the proprotor forward flight mode to an airplane forward flight mode, and configured for operation in the airplane forward flight mode, are shown respectively. Tiltrotor aircraft 100 comprises a fuselage 102, a plurality of wings 104 extending from the fuselage 102, and a tail assembly 106 having control surfaces operable for horizontal and/or vertical stabilization during forward flight. Each of the wings 104 comprises a pivotable pylon assembly 108 located proximate to the outboard end of each wing 104. The pylon assemblies 108 or portions thereof are generally rotatable relative to the fuselage 102 between a generally vertical orientation having a vertically-oriented thrust angle associated with the helicopter flight mode (shown in FIG. 1) and a generally horizontal orientation having a horizontally-oriented thrust angle associated with the proprotor forward flight mode (shown in FIG. 2). However, it will be appreciated that tiltrotor aircraft 100 may also be operated when the pylon assemblies 108 or portions thereof are selectively positioned between the helicopter mode and the proprotor forward flight mode, referred to as a conversion flight mode.

Figure 2:
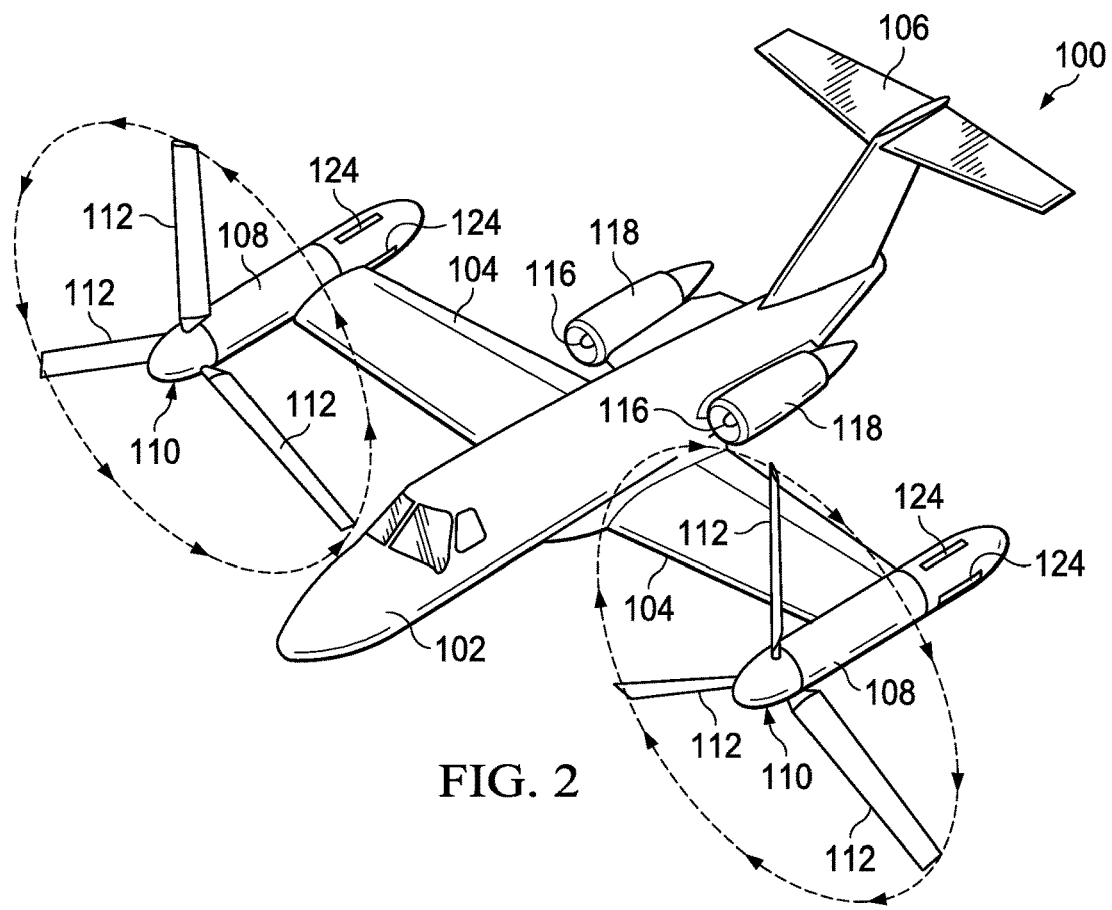
FIG. 2 is an oblique view of the tiltrotor aircraft of FIG. 1 configured for operation in a proprotor forward flight mode.
Figure 3:
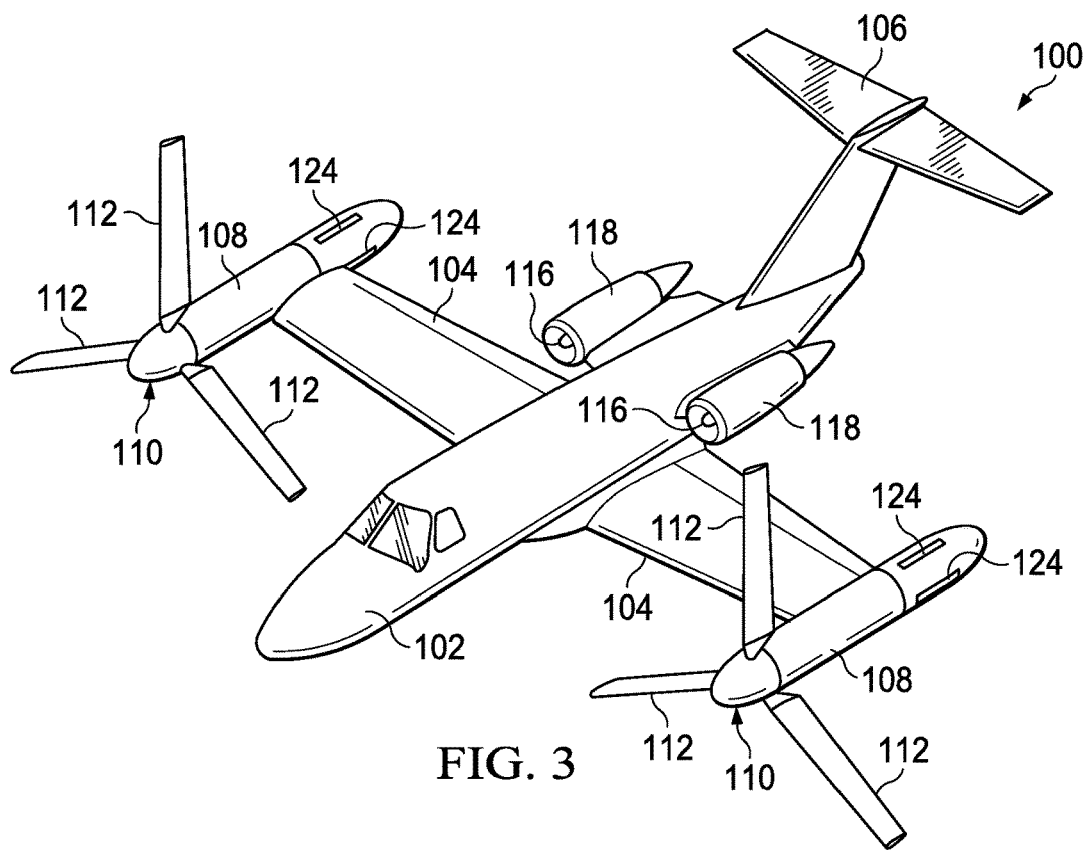
FIG. 3 is an oblique view of the tiltrotor aircraft of FIG. 1 configured in transition from the proprotor forward flight mode to an airplane forward flight mode.
Figure 4:
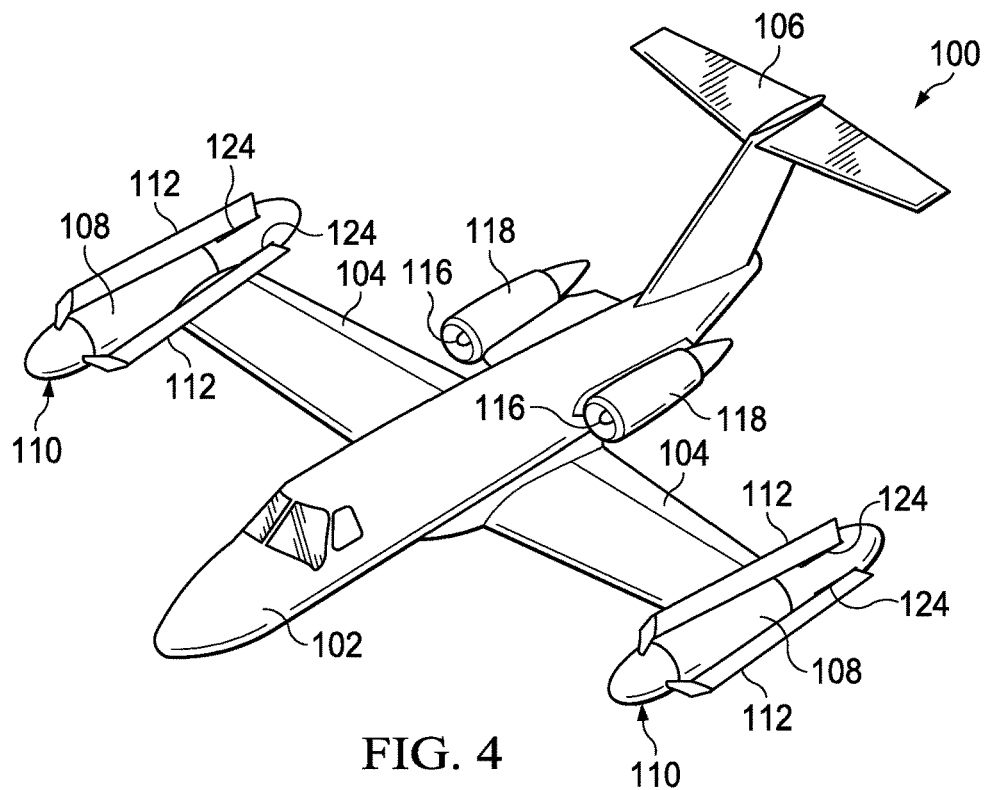
FIG. 4 is an oblique view of the tiltrotor aircraft of FIG. 1 configured for operation in the airplane forward flight mode.

Pylon assemblies 108 each house an engine, gearbox, and/or other drive system components used to selectively rotate an associated rotor system 110 comprising a plurality of rotor blades 112. In the embodiment shown, each pylon assembly 108 comprises a proprotor gearbox 114. When rotor systems 110 are driven, the plurality of rotor blades 112 are operable to be rotated as shown in FIGS. 1 and 2, feathered, stopped, clocked and subsequently locked as shown in FIG. 3, and folded as shown in FIG. 4. In the embodiment shown, rotor systems 110 are rotated responsive to torque and rotational energy provided by one or more engines 116 via an interconnect driveshaft system (not shown), proprotor gearboxes 114, and rotor masts 122. Further, engines 116 may be disposed in engine pods 118 and comprise convertible engines operable in each of a turboshaft mode (shown in FIGS. 1 and 2) to selectively impart rotation to the rotor systems 110 and a turbofan mode (shown in FIGS. 3 and 4) to provide forward thrust to tiltrotor aircraft 100.

FIG. 1 shows tiltrotor aircraft 100 in the helicopter flight mode, in which rotor systems 110 are rotating in a substantially horizontal plane to produce vertically-oriented thrust, in the form of vertical lift, to the tiltrotor aircraft 100. FIG. 2 shows tiltrotor aircraft 100 in the proprotor forward flight mode, in which rotor systems 110 are rotating in a substantially vertical plane to provide horizontally-oriented forward thrust, thereby enabling the wings 104 to provide a lifting force to tiltrotor aircraft 100 responsive to forward airspeed and enabling tiltrotor aircraft 100 to fly similarly to a conventional propeller-driven aircraft. In each of these configurations, engines 116 are operated in the turboshaft mode. In the turboshaft mode, hot combustion gases from each engine 116 cause selective rotation of the rotary propulsion system of tiltrotor aircraft 100, including engines 116, proprotor gearboxes 114, and rotor systems 110 to propel the tiltrotor aircraft 100 in each of the helicopter flight mode and the proprotor forward flight mode.

In each of the helicopter flight mode and the proprotor forward flight mode (collectively, rotary flight modes) of tiltrotor aircraft 100, rotor systems 110 are rotated in opposing directions to provide torque balance to the tiltrotor aircraft 100. In the embodiment shown, when viewed from the top of the tiltrotor aircraft 100 in the helicopter flight mode (FIG. 1) or the front of tiltrotor aircraft 100 in the proprotor forward flight mode (FIG. 2), the left rotor system 110 and associated rotor blades 112 rotate in a counterclockwise direction, and the right rotor system 110 and associated rotor blades 112 rotate in a clockwise direction. However, in other embodiments, the rotation direction of each of the left and right rotor systems 110 may be reversed. Additionally, in the embodiment shown, each rotor system 110 comprises three rotor blades 112. However, in alternative embodiments, each rotor system 110 may comprise any number of rotor blades 112, so long as each rotor system 110 comprises the same number of rotor blades 112.

FIG. 3 shows tiltrotor aircraft 100 in transition from the proprotor forward flight mode to the airplane forward flight mode. During the transition from the proprotor forward flight mode to the airplane forward flight mode, the torque path between engines 116 and rotor systems 110 is interrupted, and the rotor blades 112 are feathered, or oriented to be streamlined in the direction of flight such that a chord length of each rotor blade 112 is substantially aligned with the forward flight direction of the tiltrotor aircraft 100. The feathered rotor blades 112 thereby act as aerodynamic brakes to slow rotation of the rotor systems 110, until rotation of the rotor systems 110 ceases. In some embodiments, the rotor systems 110 may be clocked, or stopped in a predetermined or known position to prevent contact of the rotor blades 112 with the wings 104 and/or to align each rotor blade 112 with a respective slot 124 in a pylon assembly 108 when the rotor blades 112 are folded. In this configuration, engines 116 have transitioned to operating in the turbofan mode. In the turbofan mode, hot combustion gases in each engine 116 cause rotation of a power turbine coupled to an output shaft that is used to power a fan that forces bypass air through the engine 116 to produce forward thrust. This enables the tiltrotor aircraft 100 to fly similarly to a conventional jet aircraft since the rotor systems 110 are no longer providing thrust to tiltrotor aircraft 100, and the wings 104 are provide a lifting force responsive to forward airspeed of the tiltrotor aircraft 100.

FIG. 4 illustrates tiltrotor aircraft 100 in the airplane forward flight mode. In the airplane forward flight mode, the rotor blades 112 have been folded to be oriented substantially parallel to their respective pylon assemblies 108 in order to minimize drag. To prevent chatter or other movement of the rotor blades 112 when folded, the rotor blades 112 may be received within slots 124 of pylon assemblies 108. In some embodiments, the rotor blades 112 may be folded substantially ninety degrees. However, in other embodiments, the rotor blades 112 may be folded beyond ninety degrees. In this configuration, engines 116 are operating in the turbofan mode to produce thrust in order to propel the tiltrotor aircraft 100 forward. As such, the airplane forward flight mode is generally associated with high speed forward flight, with speeds exceeding those that may induce whirl flutter or other aeroelastic instabilities in the rotor systems 110 when the tiltrotor aircraft 100 is operated in the proprotor forward flight mode.

Referring to FIGS. 5 through 8, side, partial oblique left side, and partial oblique right side views of the rotor system 110 of tiltrotor aircraft 100 with a swashplate augmenting system 150 configured in a retracted position, and a side view of the rotor system 110 with the swashplate augmenting system 150 configured in an extended position, respectively, are shown. Rotor system 110 comprises rotor mast 122 coupled to a rotor hub 126, which may be gimballed or non-gimballed. Rotor hub 126 comprises one or more yokes 128 used to coupled the rotor blades 112 to the rotor hub 126 while allowing the blades to flap relative to the rotor mast 122 in out-of-plane directions. In some embodiments, the rotor hub 126 may comprise a plurality of rotor grips 130 configured to couple an associated rotor blade 112 to the rotor hub 126 and/or an associated yoke 128. Each rotor grip 130 is also operationally coupled with a pitch horn 132 that is coupled to a rotatable ring 134 of a rise-and-fall swashplate assembly 136 via a pitch link 138. The swashplate assembly 136 comprises a non-rotatable ring 140 engaged with the rotatable ring 134 and configured to guide and/or alter the position, pitch, tilt, angle, orientation, and/or translation of the rotatable ring 134. Additionally, it will be appreciated that a bearing and/or other friction-reducing component may be disposed between the rotatable ring 134 and the non-rotatable ring 140 to reduce friction and maintain the engaged configuration between the rotatable ring 134 and the non-rotatable ring 140 of the swashplate assembly 136 during operation.

In the embodiment shown, the rotatable ring 134 is generally affixed to the rotor mast 122 and rotates with the rotation of the rotor mast 122, while the non-rotatable ring 140 is mounted about the rotor mast 122 and remains stationary with respect to rotation of the rotor mast 122 and the rotatable ring 134. A plurality of swashplate actuator systems 142 are coupled to the non-rotatable ring 140 of the swashplate assembly 136. Each swashplate actuator system 142 comprises a plurality of actuators 144 that are selectively extendable and retractable to control the position, pitch, tilt, angle, orientation, and/or translation of the non-rotatable ring 140, which is then translated to the rotatable ring 134. As the rotatable ring 134 rotates with the rotor mast 122, each pitch link 138 is axially driven through engagement of the rotatable ring 134 with the non-rotatable ring 140, thereby driving the pitch horns 132 to rotate each rotor grip 130 and associated rotor blade 112 to selectively adjust the pitch of each of the rotor blades 112 of tiltrotor aircraft 100. This allows the pitch of each of the rotor blades 112 to be selectively controlled through selective extension and retraction of the actuators 144 of the swashplate actuator systems 142. In the embodiment shown, rotor system 110 comprises three swashplate actuator systems 142, each comprising three actuators 144. However, depending on the configuration of the tiltrotor aircraft 100, any number of swashplate actuator systems 142 or actuators 144 may be used.

Opposite the non-rotatable ring 140 of the swashplate assembly 136, the plurality of swashplate actuator systems 142 are coupled to a swashplate augmenting system 150 comprising an axially translatable mounting ring 152, mounting ring guide 154, primary linkage 156, secondary linkage 158, and an actuator system 160 comprising a plurality of cylinders 162. The swashplate actuator systems 142 are generally coupled to the mounting ring 152 and proportionally disposed about the mounting ring 152. The mounting ring 152 is generally axially translatable along the rotor mast 122 to augment the travel of the actuators 144 of the swashplate actuator systems 142. A mounting ring guide 154 or plurality of mounting ring guides 154 may be disposed on a rotor mast housing 146 and configured to guide the mounting ring 152 during axial motion and/or prevent angular binding of the mounting ring 152 about the rotor mast housing 146.

In the embodiment shown, primary linkage 156 and mounting ring 152 are pivotally coupled at a midpoint of each of the primary linkage 156 and the mounting ring 152 on opposing sides of the mounting ring 152. As such, the primary linkage 156 extends around the gearbox 114. The primary linkage 156 is also pivotally coupled to an actuator system 160 comprising a plurality of cylinders 162 on a first side (left side) and to a secondary linkage 158 on the opposing side (right side). As such, the secondary linkage 158 forms a horseshoe-shaped linkage and is pivotally coupled to the primary linkage 156 at a midpoint of the horseshoe and to a stationary housing 148 of the gearbox 114 or other stationary structure of the tiltrotor aircraft 100 on each side of the gearbox 114 at each end of the horseshoe. Thus, in some embodiments, the connection between the primary linkage 156 and the mounting ring 152 and the connection between the secondary linkage 158 and the housing 148 of the gearbox 114 may be axially aligned along the rotor mast 122 and located on the same front and back sides of the gearbox 114. Further, opposite the primary linkage 156, the actuator system 160 is pivotally coupled to the stationary housing 148 of the gearbox 114. However, in other embodiments, the actuator system 160 may be pivotally coupled to any component or portion of the pylon assembly 108, gearbox 114, or other component of the tiltrotor aircraft 100 within the pylon assembly 108 of the tiltrotor aircraft 100.

In the embodiment shown, swashplate augmenting system 150 comprises a single actuator system 160 having multiple cylinders 162. However, at least in some embodiments, the actuator system 160 may comprise only a single cylinder 162 or any number of cylinders 162. In other embodiments, any number of actuator systems 160 having any number of cylinders 162 may be used. The actuator system 160 may generally be substantially similar to the swashplate actuator systems 142 and comprise hydraulic actuators, electromechanical actuators, jack screw type actuators, or any other suitable actuators that allow selective extension and retraction. In operation, the actuator system 160 may be selectively extended (shown by D2 in FIG. 8) and retracted (shown by D1 in FIGS. 5 through 7), and through the linkage 156, 158, operate to axially move the mounting ring 152 along the rotor mast 122, thereby causing the swashplate assembly 136 to rise and fall, respectively. Accordingly, extension of the actuator system 160 moves the mounting ring 152 from the retracted position (P1 in FIGS. 5 through 7) towards the rotor hub 126 to the extended position (P2 in FIG. 8) causing the actuators 144 of the swashplate actuator systems 142 to also move towards the rotor hub 126. This augments the travel of the actuators 144 of the swashplate actuator systems 142 and extends the overall travel of the swashplate assembly 136. Similarly, retraction of the actuator system 160 moves the mounting ring 152 away from the rotor hub 126 causing the actuators 144 of the swashplate actuator systems 142 to also move away from the rotor hub 126. As such, in some embodiments, swashplate augmenting system 150 may be used to augment the travel of the actuators 144 of the swashplate actuator systems 142 to adjust a pitch of the rotor blades 112. However, more specifically, swashplate augmenting system 150 is used to fold the rotor blades 112 for operating tiltrotor aircraft 100 in the airplane forward flight mode as shown in FIG. 4.

Figure 5:
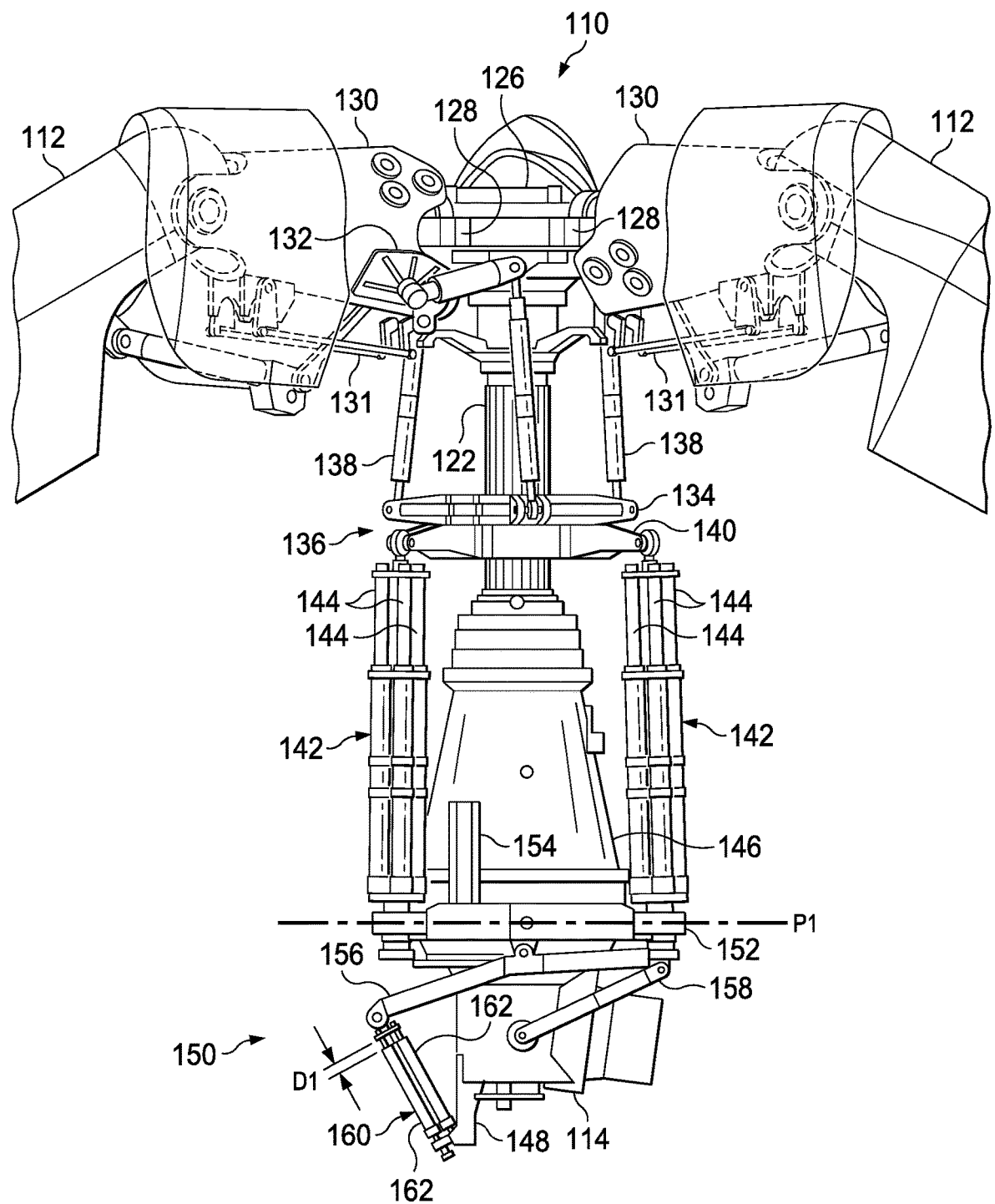
FIG. 5 is a side view of a rotor system of the tiltrotor aircraft of FIGS. 1-4 with a swashplate augmenting system according to this disclosure and configured in a retracted position.
Figure 6:
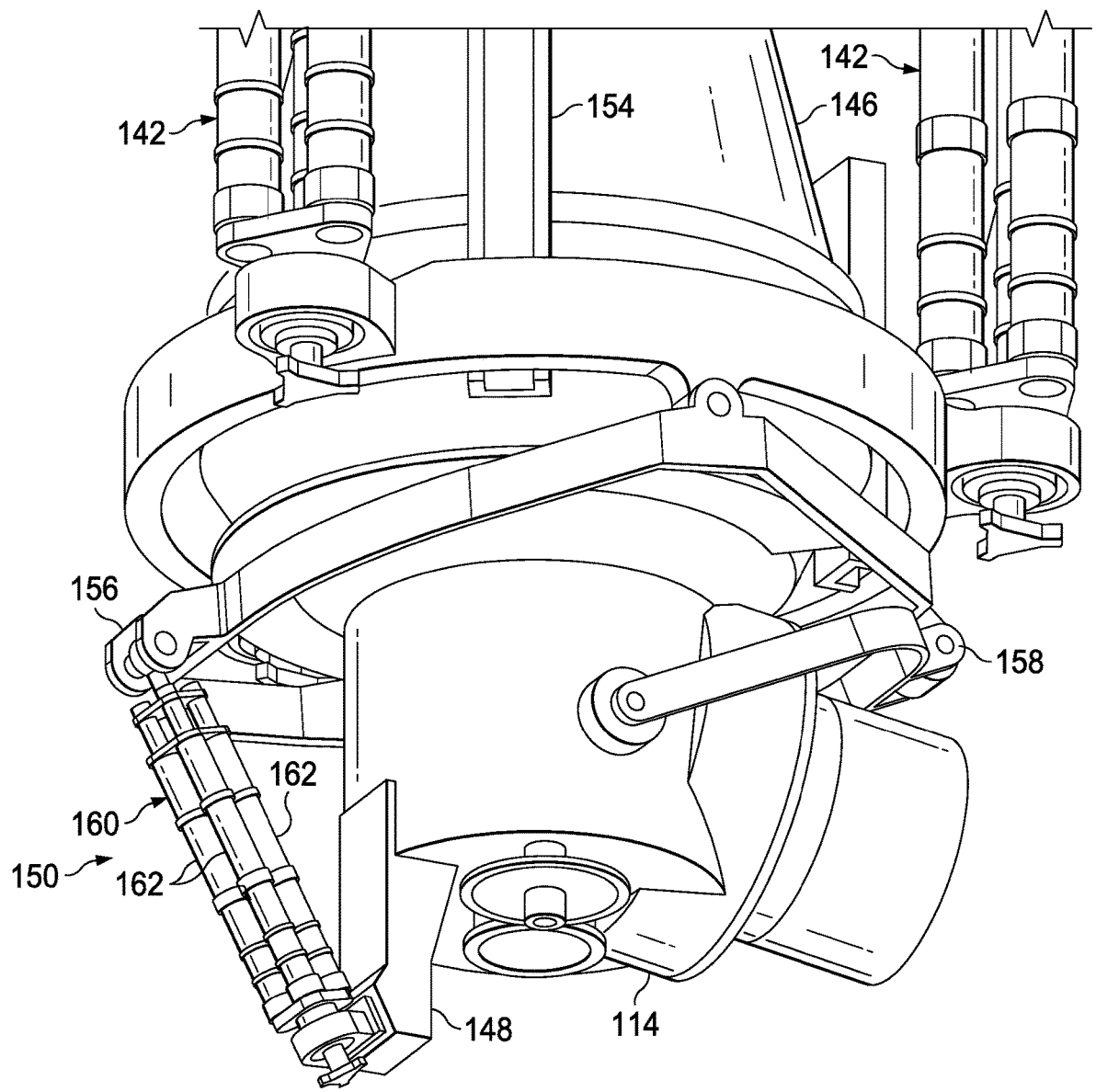
FIG. 6 is a partial oblique left side view of the rotor system of FIG. 5 with the swashplate augmenting system configured in the retracted position.
Figure 7:
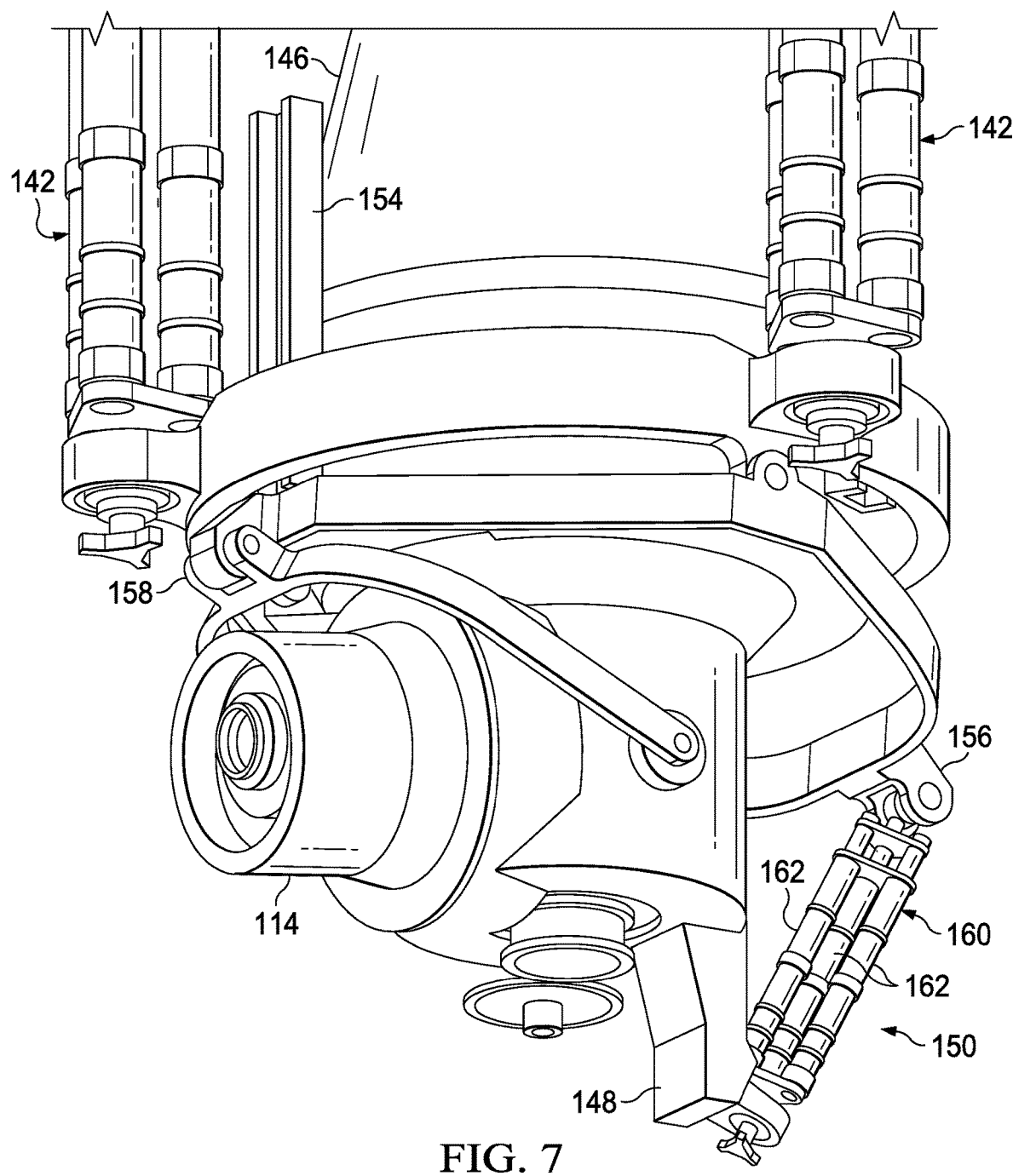
FIG. 7 is a partial oblique right side view of the rotor system of FIG. 5 with the swashplate augmenting system configured in the retracted position.
Figure 8:
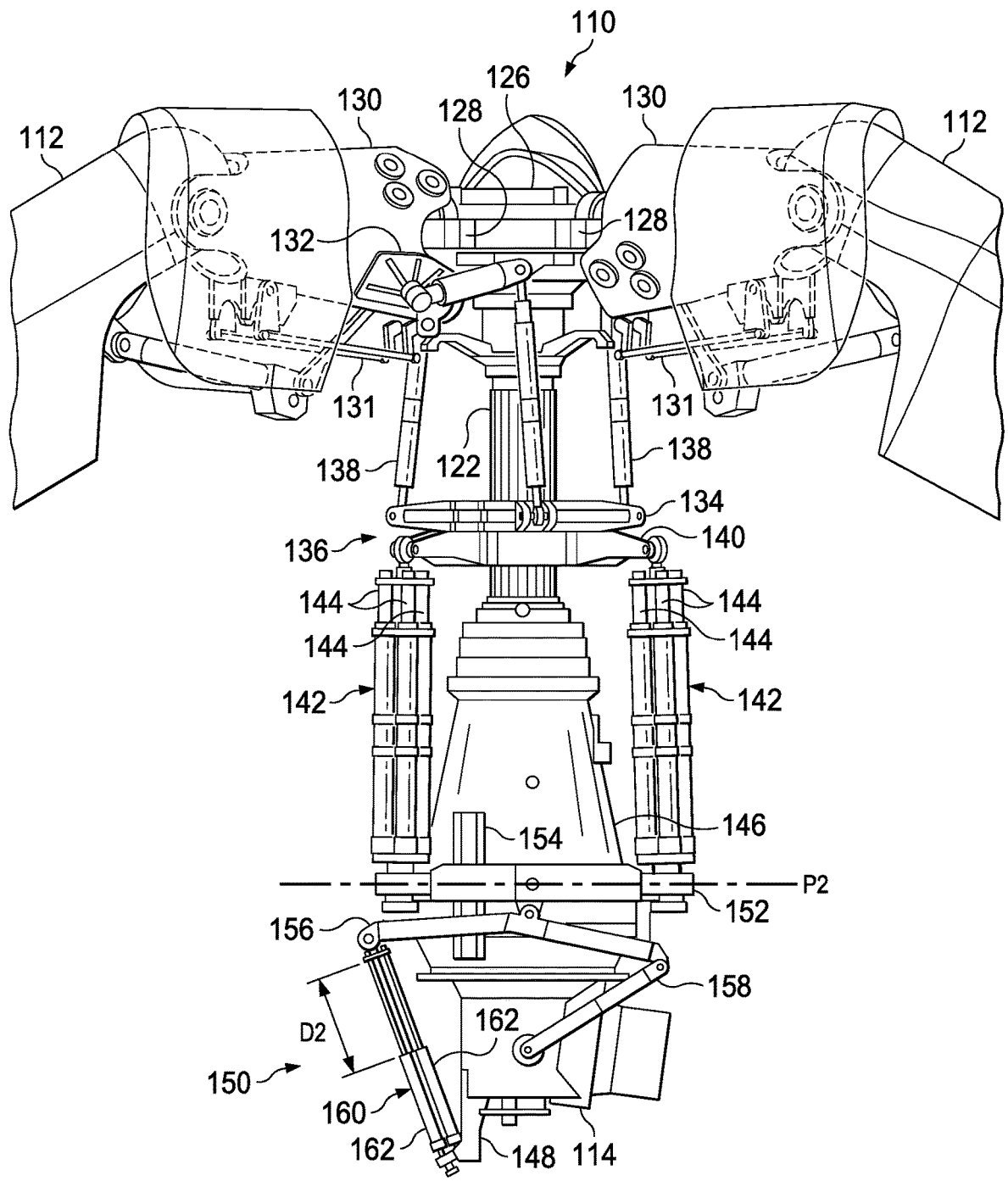
FIG. 8 is a side view of the rotor system of FIG. 5 with the swashplate augmenting system configured in an extended position.

As shown in FIGS. 5 through 7, the swashplate augmenting system 150 is in the fully retracted position (P1), and the swashplate actuator systems 142 are partially extended and actively controlling the pitch of the rotor blades 112. This is applicable when the tiltrotor aircraft 100 is operated in the rotary flight modes of FIGS. 1 and 2, such that the swashplate augmenting system 150 remains retracted to allow the swashplate actuator systems 142 to control the pitch of rotor blades 112. Additionally, the swashplate augmenting system 150 remains retracted when the rotor blades 112 are feathered by the swashplate actuator systems 142 as shown in FIG. 3. To feather the rotor blades 112 as shown in FIG. 3, the swashplate actuator systems 142 retract fully to move the swashplate assembly 136 to its furthest location from the rotor hub 126. This adjusts the pitch of the rotor blades 112, such that a chord length of each rotor blade 112 is substantially aligned with the forward flight direction of the tiltrotor aircraft 100. In this manner, swashplate augmenting system 150 is not used for collective control or feathering of the rotor blades 112 and remains stationary to provide a stable base or platform for the swashplate actuator systems 142 to precisely control the pitch of the rotor blades 112.

Once the rotor blades 112 are feathered via retraction of the swashplate actuator systems 142, the rotor blades 112 can be folded to the folded position shown in FIG. 4. To fold the rotor blades 112, fold linkage 131 used to lock the position of the rotor blades 112 may be selectively disengaged while the swashplate actuator systems 142 remain fully retracted. Once unlocked, the swashplate actuator systems 142 may be selectively extended to move the swashplate assembly 136 towards the rotor hub 126 in order to at least partially fold the rotor blades 112. The swashplate actuator systems 142 may extend fully to provide the maximum amount of fold, which is limited by the throw or maximum extension length of the actuators 144. However, to fully fold the rotor blades 112 to the folded position, additional swashplate travel is required. Thus, the actuator system 160 of the swashplate augmenting system 150 may be selectively extended (shown by D2 in FIG. 8) to move the mounting ring 152 to the extended position (P2 in FIG. 8). This further moves the swashplate actuator systems 142 and swashplate assembly 136 towards the rotor hub 126 to fully fold the rotor blades 112 to their fully folded positions. Thus, the travel of the swashplate assembly 136 provided by the swashplate actuator systems 142 is augmented, and consequently increased, by the swashplate augmenting system 150. Further, once folded, fold linkage 131 may be selectively engaged to lock the rotor blades 112 in the folded position. Still further, in some embodiments, the fold linkage 131 may be prevented from disengaging when the rotor blades 112 are not feathered.

The swashplate augmenting system 150 allows the rotor blades 112 of the tiltrotor aircraft 100 to be folded and oriented substantially parallel to their respective pylon assemblies 108 in order to minimize drag when the tiltrotor aircraft 100 is operated in the airplane forward flight mode. The swashplate augmenting system 150 remedies the problem of traditional swashplate actuators not having the requisite travel to fully fold the rotor blades 112. As such, it will be appreciated that swashplate augmenting system 150 may provide, for example, an additional five to six inches of travel. However, in some embodiments, swashplate augmenting system 150 may provide more or less additional travel. Furthermore, swashplate augmenting system 150 circumvents potential buckling failures that may be incurred if longer swashplate actuators were used. During folding and/or unfolding of the rotor blades 112, high speed or force may not be required. Thus, actuator system 160 may be designed and/or configured accordingly.

Because the swashplate augmenting system 150 provides additional travel to the swashplate assembly 136 to enable folding of the rotor blades 112, the swashplate assembly 136, swashplate actuator systems 142, and swashplate augmenting system 150 may collectively be referred to as an augmented swashplate assembly. It will be appreciated that the steps to fold the rotor blades 112 may be performed in substantially reverse order to unfold the rotor blades 112 in order to transition from the airplane forward flight mode to one of the rotary flight modes (forward flight proprotor mode and/or helicopter mode) by disengaging the fold linkage 131, retracting the swashplate assembly 136 via selective retracting of the swashplate actuator systems 142 and swashplate augmenting system 150, engaging the fold linkage 131 to lock the rotor blades 112 in the unfolded position (shown in FIG. 3), and then selectively extending the swashplate actuator systems 142 to adjust pitch of the rotor blades 112 for flight in the rotary flight modes (shown in FIGS. 1 and 2). Furthermore, tiltrotor aircraft 100 generally comprises a flight control system configured to selectively control the operation, orientation, rotation, and/or position of the pivotable pylon assemblies 108, rotor systems 110, and/or rotor blades 112 of the tiltrotor aircraft 100. Control of the operation of the tiltrotor aircraft 100 by the flight control system may be in response to inputs (e.g., collective control) made by a pilot and/or may be at least partially automated.

Figure 9:
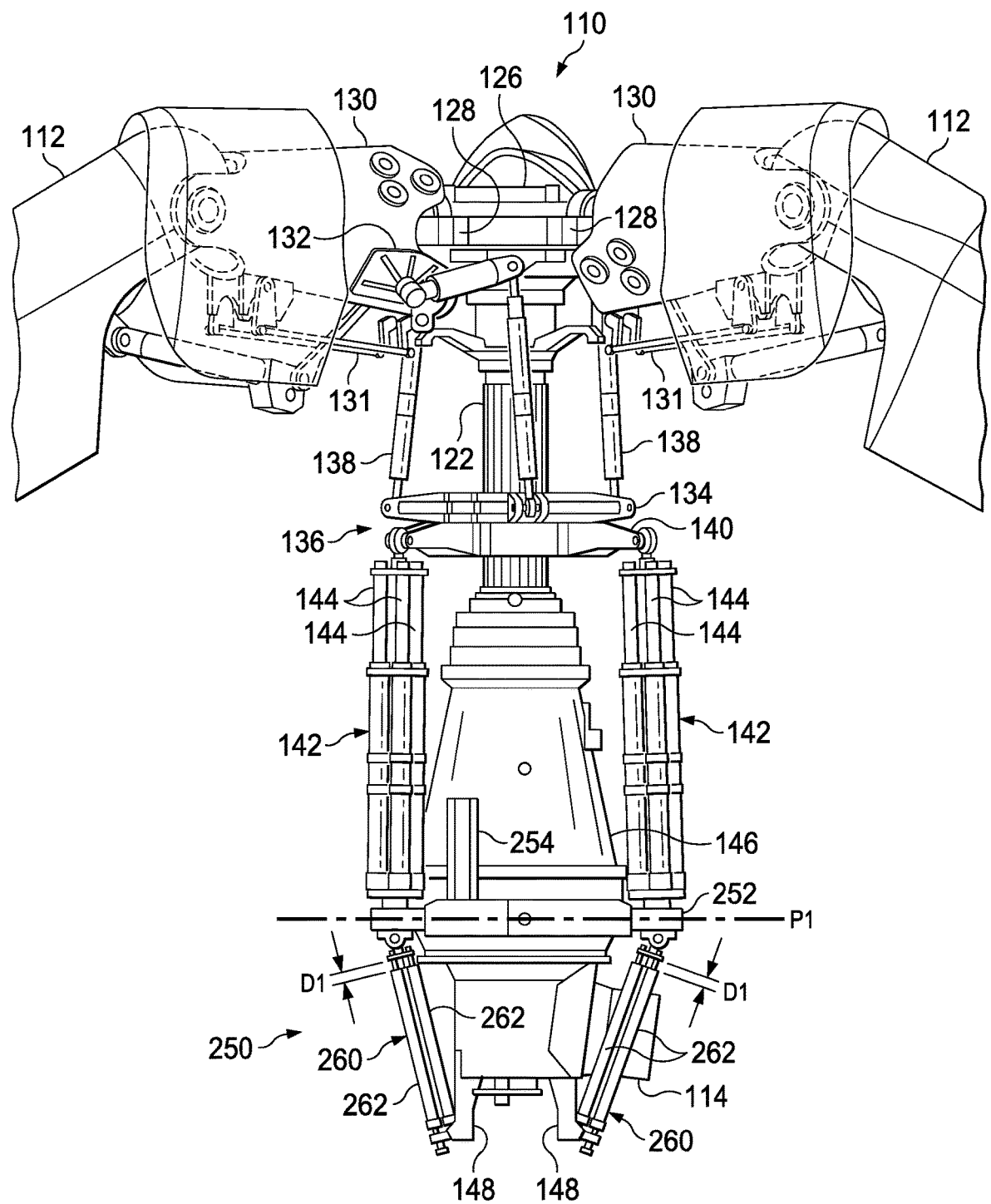
FIG. 9 is a side view of a rotor system of the tiltrotor aircraft of FIGS. 1-4 with an alternative embodiment of a swashplate augmenting system according to this disclosure and configured in a retracted position.
Figure 10:
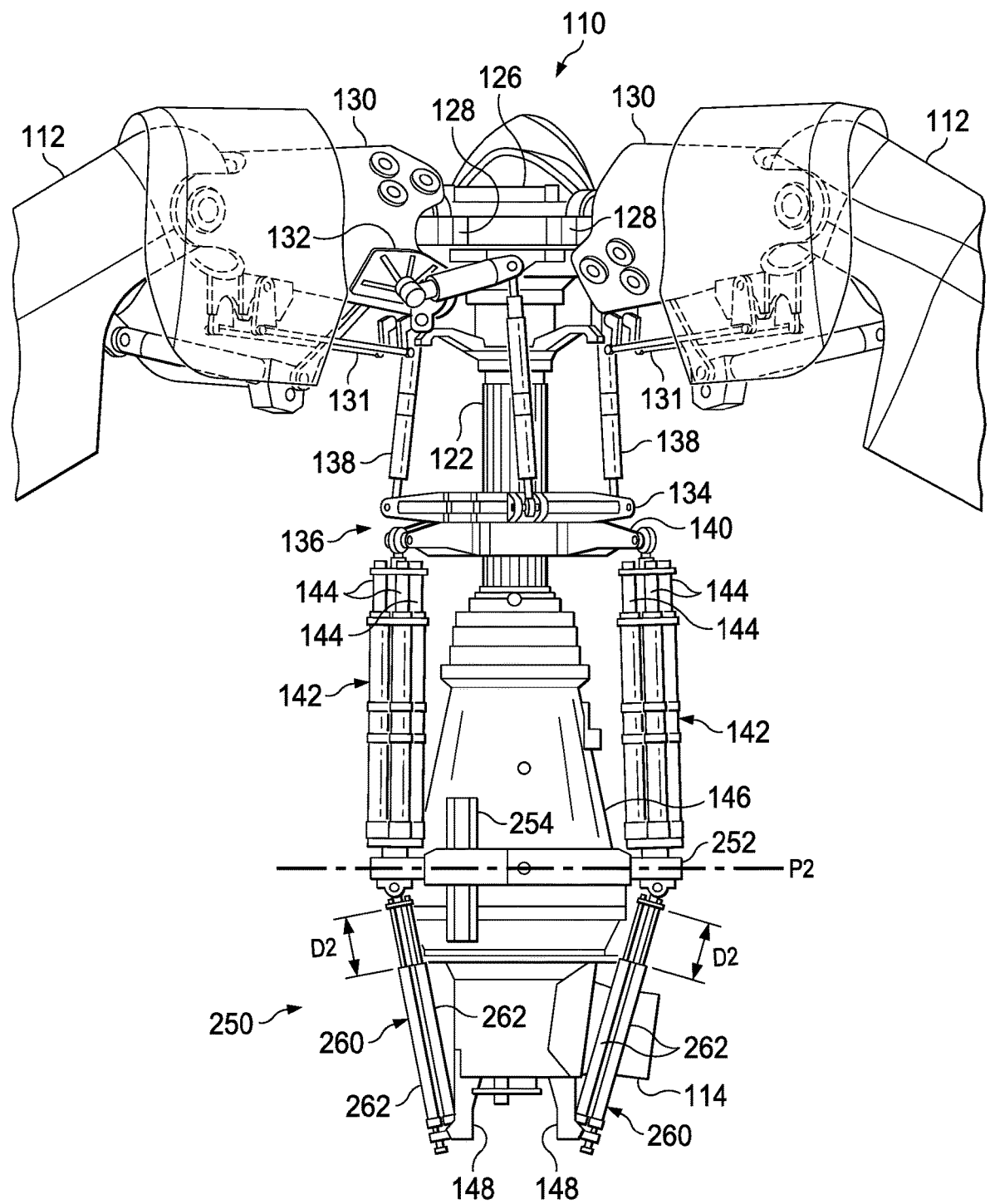
FIG. 10 is a side view of the rotor system of FIG. 7 with the swashplate augmenting system configured in an extended position.

Referring to FIGS. 9 and 10, side views of the rotor system 110 of tiltrotor aircraft 100 are shown with an alternative embodiment of a swashplate augmenting system 250 configured in a retracted position and an extended position, respectively. Swashplate augmenting system 250 is similar to swashplate augmenting system 150 and is configured to operate in a substantially similar manner to provide additional travel to the swashplate assembly 136 to enable folding of the rotor blades 112 of tiltrotor aircraft 100. However, in the embodiment shown, swashplate augmenting system 250 does not utilize the mechanical linkage 156, 158 of swashplate augmenting system 150 to provide a mechanical advantage. Instead, swashplate augmenting system 250 utilizes mounting ring 252 that employs a serial connection between the swashplate actuator systems 142 and a plurality of actuator systems 260. As such, in the embodiment shown, swashplate augmenting system 250 comprises three actuator systems 260, each having three cylinders 262. However, at least in some embodiments, actuator systems 260 may comprise only a single cylinder 262 or any number of cylinders 262. In other embodiments, any number of actuator systems 260 having any number of actuators 260 may be used. Accordingly, in other embodiments, the actuator systems 260 may not be serially connected and instead be offset circumferentially about the mounting ring 252.

Actuator system 260 may generally be substantially similar to actuator system 160 and/or the swashplate actuator systems 142 and comprise hydraulic actuators, electromechanical actuators, jack screw type actuators, or any other suitable actuators that allow selective extension and retraction. In operation, the actuator system 260 may be selectively extended (shown by D2 in FIG. 10) and retracted (shown by D1 in FIG. 9) simultaneously to axially move the mounting ring 252 along the rotor mast 122, thereby causing the swashplate assembly 136 to rise and fall, respectively. Accordingly, extension of the actuator system 260 moves the mounting ring 252 from the retracted position (P1 in FIG. 9) towards the rotor hub 126 to the extended position (P2 in FIG. 10) causing the actuators 144 of the swashplate actuator systems 142 to also move towards the rotor hub 126. This augments the travel of the actuators 144 of the swashplate actuator systems 142 and extends the overall travel of the swashplate assembly 136. Similarly, retraction of the actuator system 260 moves the mounting ring 252 away from the rotor hub 126 causing the actuators 144 of the swashplate actuator systems 142 to also move away from the rotor hub 126. As such, in some embodiments, swashplate augmenting system 250 may be used to augment the travel of the actuators 144 of the swashplate actuator systems 142 to adjust a pitch of the rotor blades 112. However, more specifically, swashplate augmenting system 250 is used to fold the rotor blades 112 for operating tiltrotor aircraft 100 in the airplane forward flight mode as shown in FIG. 4 in a substantially similar manner to swashplate augmenting system 150.

While the embodiments shown depict tiltrotor aircraft 100, it will be appreciated that swashplate augmenting systems 150, 250 may be used in any other aircraft and/or rotorcraft requiring additional swashplate travel, that may for example, be used to fold the rotor blades 112 and/or reduce the duty cycle and/or collective stroke required of a given swashplate assembly 136. This is applicable to both "manned" and "un-manned" aircraft. Folding of the rotor blades 112 may be used during operation of an aircraft in the airplane forward flight mode and/or for compact storage of an aircraft. In some embodiments, by folding the rotor blades 112 during storage of an aircraft, safety in a landing zone or hangar may be increased by preventing a person from contacting unfolded rotor blades 112. Furthermore, it will be appreciated that swashplate augmenting systems 150, 250 may be retrofit with existing aircraft and/or rotorcraft.

Figure 11:
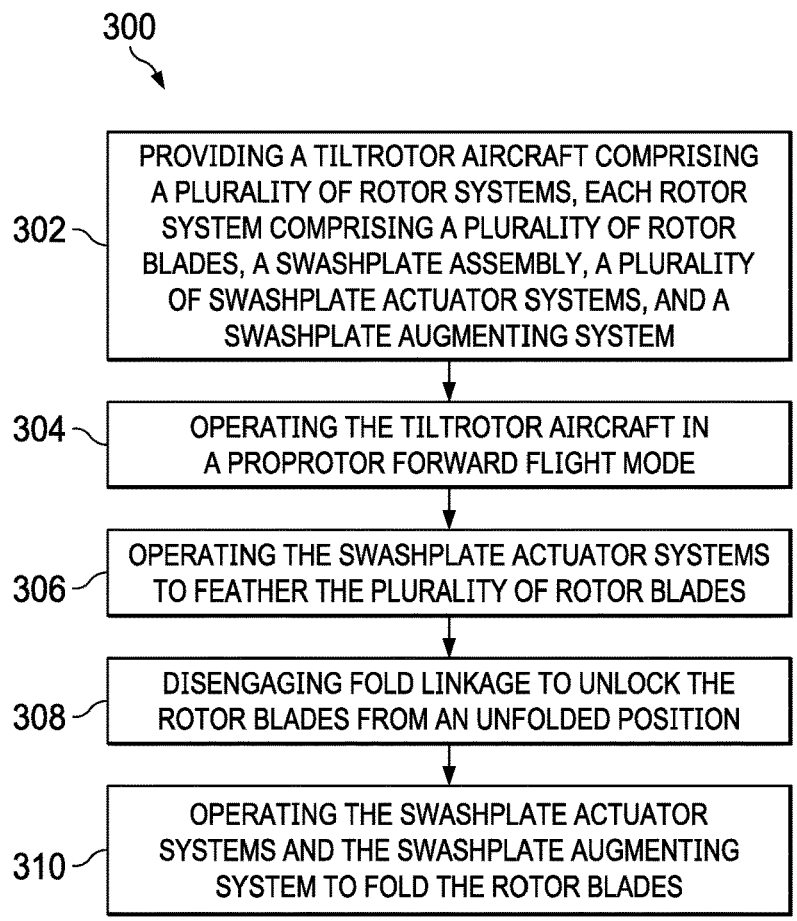
FIG. 11 is a flowchart of a method of operating a tiltrotor aircraft according to this disclosure.

Referring to FIG. 11, a flowchart of a method 300 of operating a tiltrotor aircraft 100 is shown. Method 300 begins at block 302 by providing a tiltrotor aircraft 100 comprising a plurality of rotor systems 110, each rotor system 110 comprising a plurality of rotor blades 112, a swashplate assembly 136, a plurality of swashplate actuator systems 142, and a swashplate augmenting system 150, 250. Method 300 continues at block 304 by operating the tiltrotor aircraft 100 in a proprotor forward flight mode. Method 300 continues at block 306 by operating the swashplate actuator systems 142 to feather the plurality of rotor blades 112. In some embodiments, the swashplate actuator systems 142 may be retracted in order to axially move the swashplate assembly 136. Method 300 continues at block 308 by disengaging fold linkage 131 to unlock the rotor blades 112 from an unfolded position. Method 300 continues at block 310 by operating the swashplate actuator systems 142 and the swashplate augmenting system 150, 250 to fold the rotor blades 112. In some embodiments, the fold linkage 131 may be engaged after the rotor blades 112 are folded to lock the rotor blades 112 in the folded position.

Figure 12:
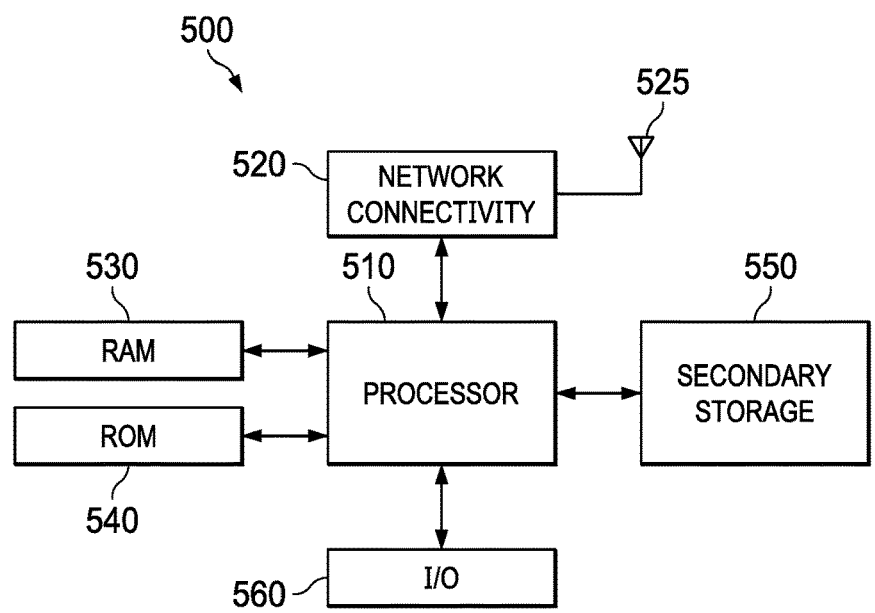
FIG. 12 is a schematic diagram of a general-purpose processor (e.g. electronic controller or computer) system suitable for implementing the embodiments of this disclosure.

Referring now to FIG. 12, a schematic diagram of a general-purpose processor (e.g. electronic controller or computer) system 500 suitable for implementing the embodiments of this disclosure is shown. System 500 that includes a processing component 510 suitable for implementing one or more embodiments disclosed herein. In particular, a flight control system of tiltrotor aircraft 100 configured to control operation of the rotor systems 110 and swashplate augmenting systems 150, 250 and/or other electronic systems disclosed herein may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, motor drive electronics, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of the flight control system of tiltrotor aircraft 100 configured to control operation of the rotor systems 110 and swashplate augmenting systems 150, 250.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
   a fuselage;
   a plurality of wings extending from the fuselage and comprising a pylon assembly that is selectively rotatable relative to the fuselage; and
   a rotor system carried by each pylon assembly and comprising:
      a plurality of rotor blades operatively coupled to a rotor mast and selectively rotatable in response to rotation of the rotor mast;
      a swashplate assembly operatively coupled to the plurality of rotor blades;
      a plurality of swashplate actuators operatively coupled to the swashplate assembly and selectively extendable and retractable to control the position and the orientation of the swashplate assembly; and
      a swashplate augmenting system comprising:
         a mounting ring operatively coupled to the plurality of swashplate actuators opposite the swashplate assembly and axially translatable along the rotor mast; and
         at least one actuator system operatively coupled to the mounting ring and selectively extendable and retractable to cause axial translation of the mounting ring to augment the travel of the swashplate actuators.

2. The aircraft of claim 1, wherein the at least one actuator system is operatively coupled to the mounting ring via mechanical linkage.

3. The aircraft of claim 2, wherein the mechanical linkage comprises a primary linkage operatively coupled to each of the at least one actuator system, the mounting ring, and a secondary linkage, and wherein the secondary linkage is operatively coupled to a stationary component of the aircraft.

4. The aircraft of claim 1, wherein the swashplate augmenting system comprises a plurality of actuator systems coupled to the mounting ring.

5. The aircraft of claim 1, wherein the swashplate augmenting system remains in a retracted position to allow the swashplate actuators to control a pitch of the plurality of rotor blades when the aircraft is operated in a helicopter flight mode and a proprotor forward flight mode.

6. The aircraft of claim 5, wherein the swashplate augmenting system remains in the retracted position to allow the swashplate actuators to retract in order to feather the plurality of rotor blades.

7. The aircraft of claim 6, wherein the swashplate augmenting system is configured to fold the plurality of rotor blades.

8. The aircraft of claim 7, further comprising: fold linkage configured to lock the position of the plurality of rotor blades to prevent folding of the rotor blades when the fold linkage is selectively engaged.

9. The aircraft of claim 7, wherein at least one actuator system is selectively extended to move the mounting ring to the extended position to fold the plurality of rotor blades to their folded positions.

10. The aircraft of claim 9, wherein the swashplate augmenting system is configured to fold the plurality of rotor blades about ninety degrees to be oriented substantially parallel to their respective pylon assemblies in their folded positions.

11. An augmented swashplate assembly for an aircraft, comprising:
   a swashplate assembly operatively coupled to a plurality of rotor blades;
   a plurality of swashplate actuators operatively coupled to the swashplate assembly and selectively extendable and retractable to control the position and the orientation of the swashplate assembly; and
   a swashplate augmenting system comprising:
      a mounting ring operatively coupled to the plurality of swashplate actuators opposite the swashplate assembly and axially translatable;
      at least one actuator system operatively coupled to the mounting ring and selectively extendable and retractable to cause axial translation of the mounting ring to augment the travel of the swashplate actuators.

12. The augmented swashplate assembly of claim 11, wherein the at least one actuator system is operatively coupled to the mounting ring via mechanical linkage.

13. The augmented swashplate assembly of claim 11, wherein the swashplate augmenting system comprises a plurality of actuator systems coupled to the mounting ring.

14. The augmented swashplate assembly of claim 11, wherein the swashplate augmenting system is configured to fold the plurality of rotor blades about ninety degrees to be oriented substantially parallel to their respective pylon assemblies in their folded positions for operating the aircraft in an airplane forward flight mode.

15. The augmented swashplate assembly of claim 14, further comprising: fold linkage configured to lock the position of the plurality of rotor blades to prevent folding of the rotor blades when the fold linkage is selectively engaged.

16. The augmented swashplate assembly of claim 14, wherein at least one actuator system is selectively extended to move the mounting ring to the extended position to fold the plurality of rotor blades to their folded positions.

17. A method of operating an aircraft, comprising:
   providing an aircraft comprising a plurality of rotor systems, each rotor system comprising a plurality of rotor blades, a swashplate assembly operatively coupled to a plurality of rotor blades, a plurality of swashplate actuators operatively coupled to the swashplate assembly and selectively extendable and retractable to control the position and the orientation of the swashplate assembly, fold linkage, and a swashplate augmenting system operatively coupled to the plurality of swashplate actuators opposite the swashplate assembly and configured to selectively augment the travel of the swashplate actuators;
   operating the aircraft in a proprotor forward flight mode;
   operating the swashplate actuators to feather the plurality of rotor blades;
   disengaging the fold linkage to unlock the rotor blades from an unfolded position;
   operating the swashplate actuators and the swashplate augmenting system to fold the plurality of rotor blades to a folded position.

18. The method of claim 17, wherein the swashplate augmenting system remains in a retracted position to allow the swashplate actuators to control a pitch of the plurality of rotor blades when the aircraft is operated in the proprotor forward flight mode and when the plurality of rotor blades are feathered.

19. The method of claim 18, wherein the feathering the plurality of rotor blades is accomplished by the swashplate actuators retracting to move the swashplate assembly axially along a rotor mast of each rotor system.

20. The method of claim 19, wherein the folding the plurality of rotor blades is accomplished by the swashplate actuators and the swashplate augmenting system extending to move the swashplate assembly axially along the rotor mast of each rotor system.

\* \* \* \* \*